(12) United States Patent (10) Patent No.: US 9,232,043 B2
Park (45) Date of Patent: Jan. 5, 2016

(54) MOBILE TERMINAL AND CONTROL METHOD THEREOF

(75) Inventor: Seungyong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 451 days.

(21) Appl. No.: 12/915,885

(22) Filed: Oct. 29, 2010

(65) Prior Publication Data

US 2011/0219332 A1  Sep. 8, 2011

(30) Foreign Application Priority Data

Mar. 3, 2010 (KR) .......................... 10-2010-0019057
May 12, 2010 (KR) .......................... 10-2010-0044284
May 12, 2010 (KR) .......................... 10-2010-0044285

(51) Int. Cl.
  *G06F 3/0482* (2013.01)
  *H04M 1/725* (2006.01)
  *G06F 3/0488* (2013.01)
  *G06F 3/0484* (2013.01)

(52) U.S. Cl.
  CPC ......... *H04M 1/72583* (2013.01); *G06F 3/0482* (2013.01); *G06F 3/04842* (2013.01); *G06F 3/04883* (2013.01); *H04M 2250/16* (2013.01); *H04M 2250/22* (2013.01)

(58) Field of Classification Search
  CPC ............. G06F 3/0482; G06F 2206/04807; G06F 3/0236; G06F 9/4443; G06F 3/04817; G06F 3/04842; H04N 5/44543; H04N 1/00413; H04N 1/00424; H04N 1/00427; H04N 1/00472; H04N 1/00474; H04N 1/00482; H04M 1/72583; H04L 41/22
  USPC ................................................. 715/810, 820
  See application file for complete search history.

(56) References Cited

U.S. PATENT DOCUMENTS

| 5,179,653 | A  | * | 1/1993  | Fuller ........................... 715/840 |
| 5,826,051 | A  | * | 10/1998 | Porter et al. ................... 715/810 |
| 6,917,822 | B1 | * | 7/2005  | Mori ................. H04M 1/72561 455/564 |
| 7,218,926 | B2 | * | 5/2007  | Bocking et al. ............... 455/419 |
| 7,376,913 | B1 | * | 5/2008  | Fleck et al. ................... 715/864 |
| 8,600,445 | B2 | * | 12/2013 | Park ...................... G06F 1/1626 455/550.1 |
| 2005/0188331 | A1 | * | 8/2005 | Shimada ............. G06F 3/04817 715/816 |
| 2006/0105753 | A1 | * | 5/2006 | Bocking et al. ............... 455/417 |
| 2006/0218508 | A1 | * | 9/2006 | Mugura ................ G06F 3/0236 715/810 |
| 2006/0238625 | A1 | * | 10/2006 | Sasaki ................ H04N 1/00416 348/231.3 |
| 2007/0036346 | A1 | * | 2/2007 | Kwon ................... G06F 3/0482 379/413 |
| 2007/0185962 | A1 | * | 8/2007 | Bocking et al. ............... 709/206 |
| 2009/0327960 | A1 | * | 12/2009 | Dernis ......................... 715/823 |
| 2010/0004031 | A1 | * | 1/2010 | Kim ................ H04M 1/274525 455/566 |

(Continued)

*Primary Examiner* — Shen Shiau
(74) *Attorney, Agent, or Firm* — Birch, Stewart, Kolasch & Birch, LLP

(57) ABSTRACT

A mobile terminal and a control method thereof are provided. The method according to an embodiment includes displaying, on a screen of the display unit, a first image including a plurality of items; receiving a selection of at least one item among the plurality of displayed items; indicating, on the first image, the at least one selected item as selected; while the at least one selected item is indicated as selected, receiving a user input for executing an operation that involves the screen to display an image different from the first image; executing the operation according to the user input, the executing step including displaying, on the screen, a second image associated with the operation; and after the operation is executed, re-displaying, on the screen, the first image having one or more of the at least one selected item as still selected.

20 Claims, 21 Drawing Sheets

(56) References Cited

U.S. PATENT DOCUMENTS

| | | | |
|---|---|---|---|
| 2010/0106864 A1* | 4/2010 | Li et al. ............................ 710/17 |
| 2010/0153111 A1* | 6/2010 | Hirai ................... B60R 16/0373 704/251 |
| 2010/0229120 A1* | 9/2010 | Inoue .................... G06F 3/0482 715/811 |
| 2010/0269040 A1* | 10/2010 | Lee ..................... G06F 3/04817 715/702 |
| 2010/0299599 A1* | 11/2010 | Shin ..................... G06F 3/0482 715/702 |
| 2011/0035691 A1* | 2/2011 | Kim ................... G06F 3/04817 715/765 |
| 2011/0081952 A1* | 4/2011 | Song .................. H04N 1/00307 455/566 |
| 2011/0219333 A1* | 9/2011 | Park .................. H04M 1/72583 715/808 |
| 2011/0219334 A1* | 9/2011 | Park .................. H04M 1/72583 715/808 |
| 2012/0084691 A1* | 4/2012 | Yun ................... H04M 1/72519 715/769 |

\* cited by examiner (a)

(b)

(a)

(b)

(a)

(b)

(a)

(b)

(a)

(b)

(a)

(b)

(c)

(a)

(b)

(a)

(b)

(a)

(b)

(a)

(b)

(a)

(b)

(a)

(b)

MOBILE TERMINAL AND CONTROL METHOD THEREOF

This application claims the priority benefits of Korean Patent Application No. 10-2010-0019057 filed on Mar. 3, 2010, Korean Patent Application No. 10-2010-0044284 filed on May 12, 2010, and Korean Patent Application No. 10-2010-0044285 filed on May 12, 2010. The entire contents of each of these applications are hereby incorporated by reference.

BACKGROUND

1. Field of the Invention

This document relates to a mobile terminal and a control method thereof, and more particularly, to a mobile terminal and a control method thereof for maintaining a user's choice with respect to an item even when an event of changing the screen display according to a direct input from a user is generated.

2. Discussion of the Related Art

As functions of terminals such as personal computers, laptop computers, cellular phones and the like are diversified, the terminals are constructed in the form of a multimedia player having multiple functions of capturing pictures or moving images, playing music, moving image files and games and receiving broadcasting programs.

Terminals can be divided into mobile terminals and stationary terminals. The mobile terminals can be classified into handheld terminals and vehicle mount terminals according to whether the users can personally carry the terminals.

To support and enhance the functions of a terminal, a structural part and/or a software part of the terminal may be enhanced. As a variety of terminals including the mobile terminals provide complicated and various functions, a menu structure becomes also complicated. Furthermore, a function of displaying digital documents including web pages is added to the functions of the mobile terminals.

SUMMARY

An aspect of the invention is to provide a mobile terminal and a control method thereof for maintaining a user's choice with respect to an item even when an event of changing the screen display according to a direct input from a user is generated.

It is another object of the present invention to provide a terminal and its control method where during an item selecting process, if a screen image changing event occurs due to a direct user input, then the item selected thus far is maintained even after the screen image changing event occurs.

It is another object of the present invention to provide a terminal and method for controlling a user's selection on a screen of the mobile, which address the limitations and disadvantages associated with the related art.

According to an embodiment, the invention provides a method of controlling a mobile terminal including a display unit, the method including displaying, on a screen of the display unit, a first image including a plurality of items; receiving a selection of at least one item among the plurality of displayed items; indicating, on the first image, the at least one selected item as selected; while the at least one selected item is indicated as selected, receiving a user input for executing an operation that involves the screen to display an image different from the first image; executing the operation according to the user input, the executing step including displaying, on the screen, a second image associated with the operation; and after the operation is executed, re-displaying, on the screen, the first image having one or more of the at least one selected item as still selected.

According to an embodiment, the invention provides a mobile terminal including a display unit including a screen; and a controller configured to control the display unit and to: display, on the screen, a first image including a plurality of items; receive a selection of at least one item among the plurality of displayed items; indicate, on the first image, the at least one selected item as selected; while the at least one selected item is indicated as selected, receive a user input for executing an operation that involves the screen to display an image different from the first image; execute the operation according to the user input, the executing step including displaying, on the screen, a second image associated with the operation; and after the operation is executed, re-display, on the screen, the first image having one or more of the at least one selected item as still selected.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention.

DETAILED DESCRIPTION OF PREFERRED EMBODIMENTS

Embodiments of the present invention will now be described more fully with reference to the accompanying drawings, in which exemplary embodiments of the invention are shown. The embodiments of the invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to various embodiments of the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include, but is not limited to, a cellular phone, a smart phone, a laptop computer, a digital broadcasting terminal, personal digital assistants (PDA), a portable multimedia player (PMP), a portable TV device, a navigation system and so on.

However, those skilled in the art will easily understand that configurations according to embodiments of the present invention can also be applied to stationary terminals such as digital TV and desktop computers except a case where the configurations can be applied to only mobile terminals.

Figure 1:
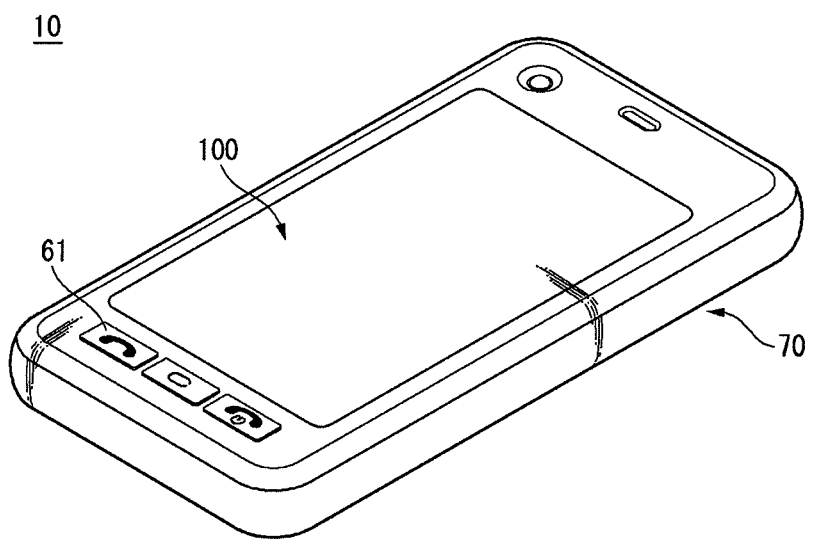
FIG. 1 is a perspective view of a mobile terminal according to an embodiment of the present invention.

FIG. 1 is a perspective view of a mobile terminal 10 according to an embodiment of the present invention.

Referring to FIG. 1, the mobile terminal 10 according to an embodiment of the present invention may include a body 70 and a touch screen 100 attached to one side of the body 70.

The body 70 may form the external appearance of the mobile terminal 10 and protect internal components of the mobile terminal 10 from impact applied to the mobile terminal 10. The body 70 may be formed of a plastic material including engineering plastics or metal including steel to effectively absorb impact, or a combination thereof. The body 70 may be formed from a single molded piece or formed by assembling multiple molded pieces. The body 70 may include various buttons 61, and may include components that are commonly known in mobile terminals.

The buttons 61 may be appropriately disposed on the front face, side and rear face of the body 70 according to design needs. The number of buttons 61 may be adjusted according to design needs. As a variation, the body 70 may not have any physical button.

The touch screen 100 may be attached to at least one side of the body 70. For example, the touch screen 100 may be attached to the front side or the backside of the body 70. As a variation, the touch screen 100 may be attached to both the front side and the backside of the body 70. Moreover, the touch screen 100 may be transparent such that an object behind the mobile terminal 10 can be seen through the touch screen 100. Though the term 'touch screen' is used since the touch screen 100 displays images and receives touch inputs, the touch screen may be referred to as a display. The mobile terminal 10 can further include known components such as an audio output, a controller/processor, a memory, a camera, etc.

Figure 2:
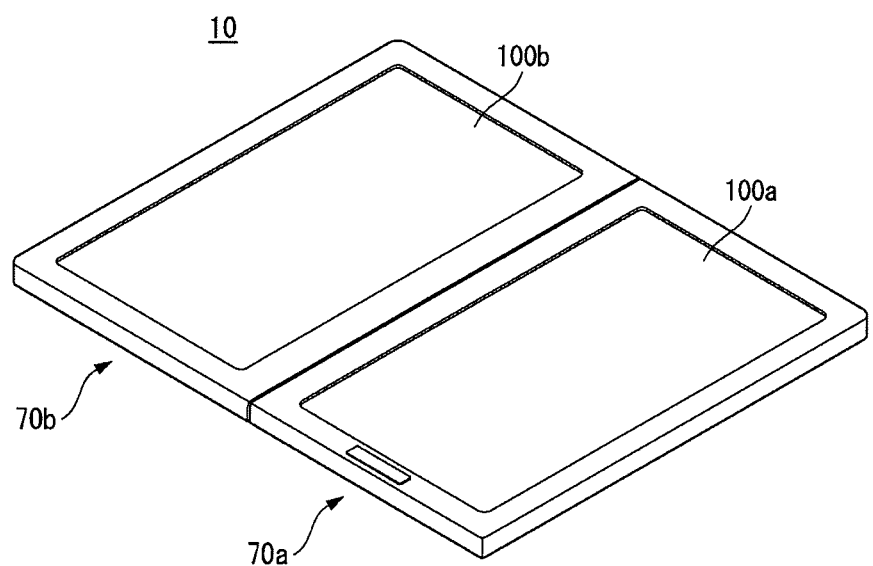
FIG. 2 is a perspective view of a mobile terminal according to another embodiment of the present invention.

FIG. 2 is a perspective view of a mobile terminal according to another embodiment of the present invention.

Referring to FIG. 2, the mobile terminal 10 according to this embodiment of the present invention may include first and second touch screens 100a and 100b respectively mounted in first and second bodies 70a and 70b.

The first and second bodies 70a and 70b may be respectively formed and assembled. For example, the first and second bodies 70a and 70b may be respectively formed in a hexahedral shape. The first and second bodies 70a and 70b may rotate on a hinge to be in a closed status or an open status. The first and second bodies 70a and 70b are folded in the closed status and unfolded and arranged in parallel with each other in the open status. In the open status, a user can view images displayed on a wider screen because the first and second bodies 70a and 70b are unfolded. The mobile terminal 10 of FIG. 2 may also include known components such as an audio output, a controller/processor, a memory, a camera, etc.

Figure 3:
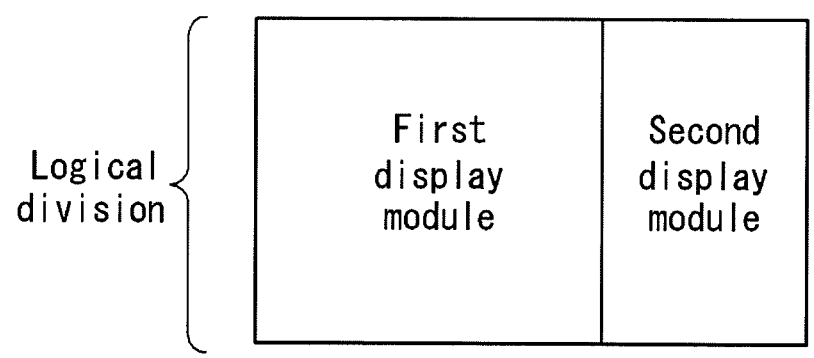
FIG. 3 is a view for explaining an example of a logical division of a display of a mobile terminal according to an embodiment of the invention.

FIG. 3 is a view for explaining an example of a logical division of a display usable in the mobile terminal of the invention.

Referring to FIG. 3, a touch screen (e.g., the touch screen 100, 70a, or 70b) may be divided into a plurality of regions in a single display panel. For example, the touch screen can function as multiple touch screens (multiple display modules) logically although the touch screen is in a single body physically. When the touch screen is divided into a plurality of regions, different images can be respectively displayed on the plurality of regions. Furthermore, a touch input applied to one of the plurality of regions can be distinguished from a touch input applied to another region among the regions of the touch screen. The terminal in which the touch screen is disposed can selectively and independently control images displayed in each of the regions of the touch screen.

Figure 4:
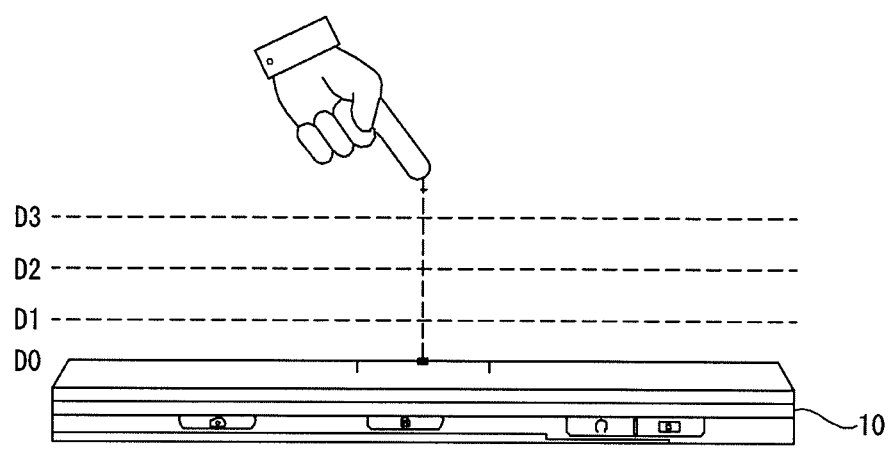
FIG. 4 is a view for explaining an example of a proximity depth of a proximity sensor of a mobile terminal according to an embodiment of the invention.

FIG. 4 is a view for explaining a proximity depth of a proximity sensor which can be used in the mobile terminal of the invention.

As shown in FIG. 4, the proximity sensor may be disposed in an internal region of the mobile terminal 10, which is surrounded by a touch screen, or near the touch screen. The proximity sensor senses a presence or absence of an object approaching a predetermined sensing face or an object disposed in proximity to the sensing face using electromagnetic force or infrared rays without having a direct mechanical contact. The proximity sensor preferably has a lifetime that is longer than that of a contact sensor and is used for a wide range of applications.

Examples of the proximity sensor include a transmitting photoelectric sensor, a direct reflex photoelectric sensor, a mirror reflective photoelectric sensor, a high-frequency oscillating proximity sensor, a capacitance type proximity sensor, a magnetic proximity sensor, an infrared proximity sensor and so on.

In the case of a capacitive touch screen, the proximity sensor is constructed such that it senses proximity of a pointer according to a variation in electric field due to the proximity of the pointer. In this case, the touch screen (touch sensor) may be classified as a proximity sensor.

For convenience of explanation, an action of moving the pointer towards the touch screen while the pointer is not being in contact with the touch screen such that the location of the pointer on the touch screen is recognized, is referred to as "proximity touch" and an action of bringing the pointer into contact with the touch screen is referred to as "contact touch" in the following description. A proximity touch point of the pointer on the touch screen preferably means a point of the touch screen to which the pointer corresponds perpendicularly to the touch screen when the pointer proximity-touches the touch screen.

The proximity sensor senses a proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be processed by the mobile terminal and displayed on the touch screen of the mobile terminal.

Figure 5:
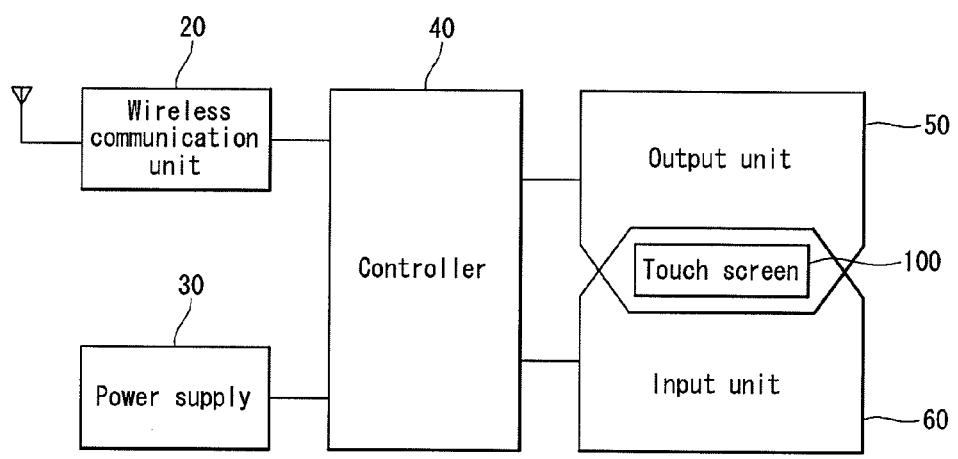
FIG. 5 is a block diagram of the mobile terminal according to an embodiment of the present invention.

FIG. 5 is a block diagram of the mobile terminal 10 according to an embodiment of the present invention. The mobile terminal 10 of FIG. 5 can be any mobile terminal discussed herein including the mobile terminal of FIGS. 1-4.

Referring to FIG. 5, the mobile terminal 10 according to an embodiment of the present invention may include a wireless communication unit 20, an input unit 60, an output unit 50, a controller 40, a power supply 30 and a touch screen 100. The mobile terminal 10 also includes additional components which may be known such as a storage unit, an audio unit, etc. All components of the mobile terminal 10 according to various embodiments are operatively coupled and configured.

The wireless communication unit 20 may include at least one module for enabling wireless communication between the mobile terminal 10 and a wireless communication system or wireless communication between the mobile terminal 10 and a network in which the mobile terminal 10 is located. For example, the wireless communication unit 20 may include one or more of a broadcast receiving module, a mobile communication module, a wireless Internet module, a local area communication module and a position information module.

The input unit 60 receives input data for controlling the operation of the mobile terminal 10, input by a user. The input unit 60 may be implemented using one or more of a key pad, a dome switch, a jog wheel or a jog switch as well as a constant voltage type touch pad or a capacitive touch pad.

The output unit 50 generates visual, auditory and/or tactile outputs. The output unit 50 may include an audio output module, an alarm and a reaction module in addition to the touch screen 100.

The controller 40 controls the overall operation of the mobile terminal 10. For example, the controller 40 may perform control and processing with respect to voice communication, data communication and video communication. The controller 40 may include a multimedia module for multimedia reproduction. Furthermore, the controller 40 may carry out pattern recognition for respectively recognizing handwriting inputs and drawing inputs applied to the touch screen as characters and images.

The power supply 30 receives external power and internal power under the control of the controller 40 and provides power to the components of the mobile terminal 10 to operate.

The touch screen 100 may be mounted in the front side of the body (e.g., the body 70 shown in FIG. 1). The touch screen 100 may display information and other data. Furthermore, the touch screen 100 may display information such that a user can select specific information. The touch screen 100 may be constructed by assembling a display panel and a touch panel. For example, the touch screen 100 can be constructed in such a manner that a touch panel capable of receiving touch inputs is mounted on a display panel composed of, e.g., LCD or OLED. Furthermore, the display panel and the touch panel may be integrated to produce the touch screen 100. Resistant, capacitive, infrared and ultrasonic touch panels can be used for the touch screen. Among these touch panels, the capacitive touch panel senses a variation in the capacitance between conductive layers included in the touch panel to recognize a touch input. The capacitive touch panel may include two conductive layers, an insulating substrate and a passivation layer, which is not shown in the drawings. Furthermore, the capacitive touch panel may further include a shield layer for improving a signal-to-noise ratio. The touch screen 100 may be the output unit 50 and the input unit 60 because the touch screen 100 includes the display panel displaying images and the touch panel receiving touch inputs.

Figure 6:
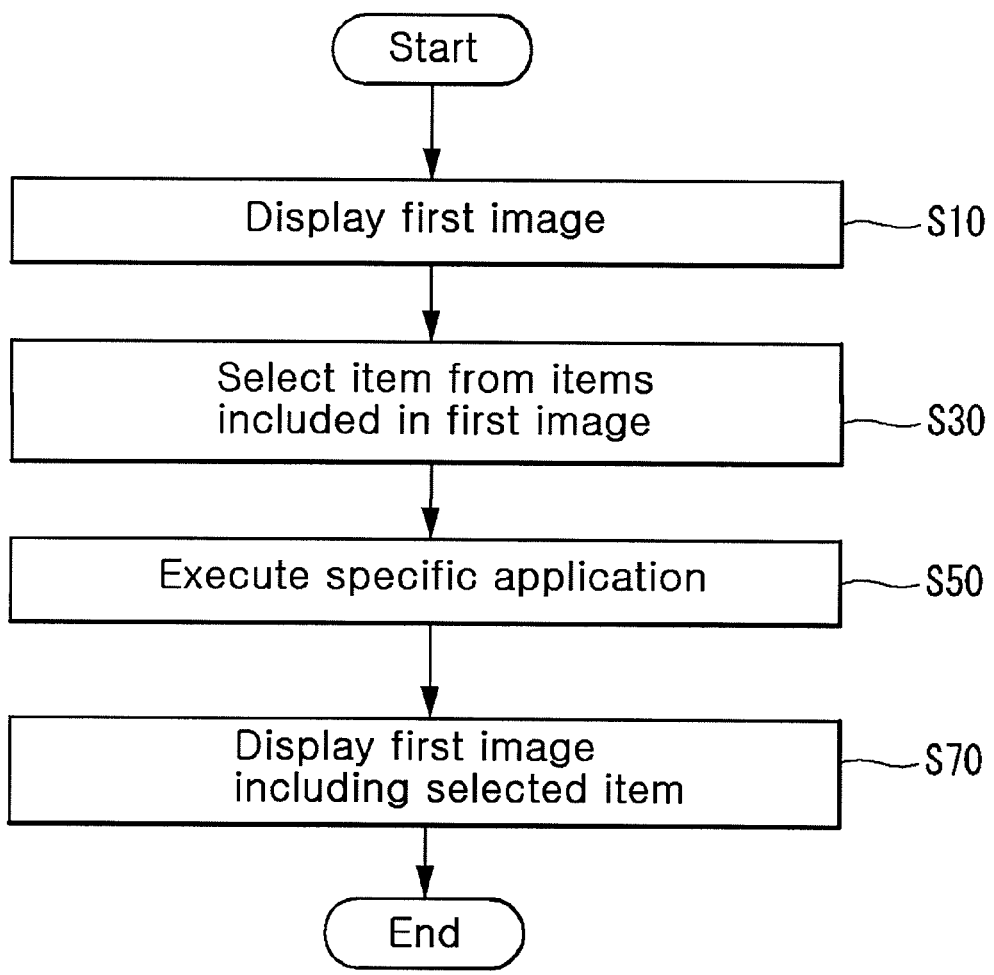
FIG. 6 is a flowchart showing an operation of the mobile terminal shown in FIG. 5 according to an embodiment of the present invention.

FIG. 6 is a flowchart showing an operation of the mobile terminal shown in FIG. 5 or in other figures.

Referring to FIGS. 5 and 6 as an example, the controller 40 of the mobile terminal 10 may include an operation S10 of displaying a first image on a screen (e.g., touch screen 100) of the mobile terminal 100. The first image displayed may include various contents/data that can be output through the touch screen 100 of the mobile terminal 10. For example, the displayed first image may include a web page, a picture file list or thumbnail, a music file list, an e-mail list, an SMS or MMS message list, various documents, etc. That is, visually recognizable information can be displayed on the touch screen 100.

When the first image is displayed, an operation S30 of selecting an item displayed on the first image may be executed. The item preferably displayed on or as part of the first image may be a selectable object/item. If the first image corresponds to a web page, then for example, words, texts, pictures, moving pictures, links, etc. included in the web page may be items. If the first image corresponds to an e-mail list, then each e-mail may be an item. The first image may include a plurality of items. For example, a web page may include multiple texts, multiple pictures or multiple links, each or some of which can be an item that can be selected by a user. The controller 40 of the mobile terminal 10 allows the user to select one or more of these plurality of items displayed on the screen.

An operation S50 of executing one or more specific applications may be performed while or after one of the item(s) included in the first image is selected. The specific application may be a program or a process for carrying out a function of the mobile terminal 10, which is initiated by the user according to the user's direct input. For example, the user may desire to make a call through a mobile communication module included in the wireless communication unit 20 of the mobile terminal 10 while the user is selecting (or has begun to select) item(s) by touching the item(s) included in the displayed first image. At this time, when the user selects the call making button/menu, the user's process of selecting the items of the first image is interrupted, and the controller 40 may load a call application capable of processing the call making request from a memory of the mobile terminal and execute the call application. When the call application is executed, the screen image changes from the first image to an image associated with the calling making operation. When the call making operation is requested by the user, the display of the touch screen 100 is changed. For example, the first image displaying the selectable items may be changed into a call making image accompanied by a sound or vibration that informs the user that a call is being made. When an event of executing the specific application is ended or interrupted, execution of the specific application may be ended or interrupted.

When the execution of the specific application is completed (or interrupted), e.g., the user has completed the phone call, then an operation S70 of re-displaying the first image on which the item(s) are selected (or have been selected) is carried out. For example, when the specific application is executed, an image corresponding to the executed application may be displayed on the screen of the mobile terminal (e.g., during the operation S50), as described above. Accordingly, the whole first image or a part of the first image may not be displayed while the image corresponding to the application being executed is being displayed. If the execution of the specific application is completed or stopped, and thus displaying the image corresponding to the application is no longer needed (or cancelled), then the first image is preferably re-displayed on the screen of the mobile terminal. At this point, according to the embodiment of the present invention, the re-displayed first image displays those items (or contents) already selected by the user up until the execution of the specific application started (or another application is executed).

For instance, if the user selected an item A during the item selecting process, and during this process, an event occurs which is initiated by the user according to the user's direct input (e.g., activating a camera function) which interrupts the item selecting process. Then after the camera has been used, the screen re-displays the first image having the item A as being already selected. As a result, the first image is re-displayed with the user's selections still maintained. Thus it is possible to mitigate the inconvenience of having to re-select the item A on the re-displayed first image even after a specific event that is directly initiated by the user is abruptly generated to execute another function.

Figure 7:
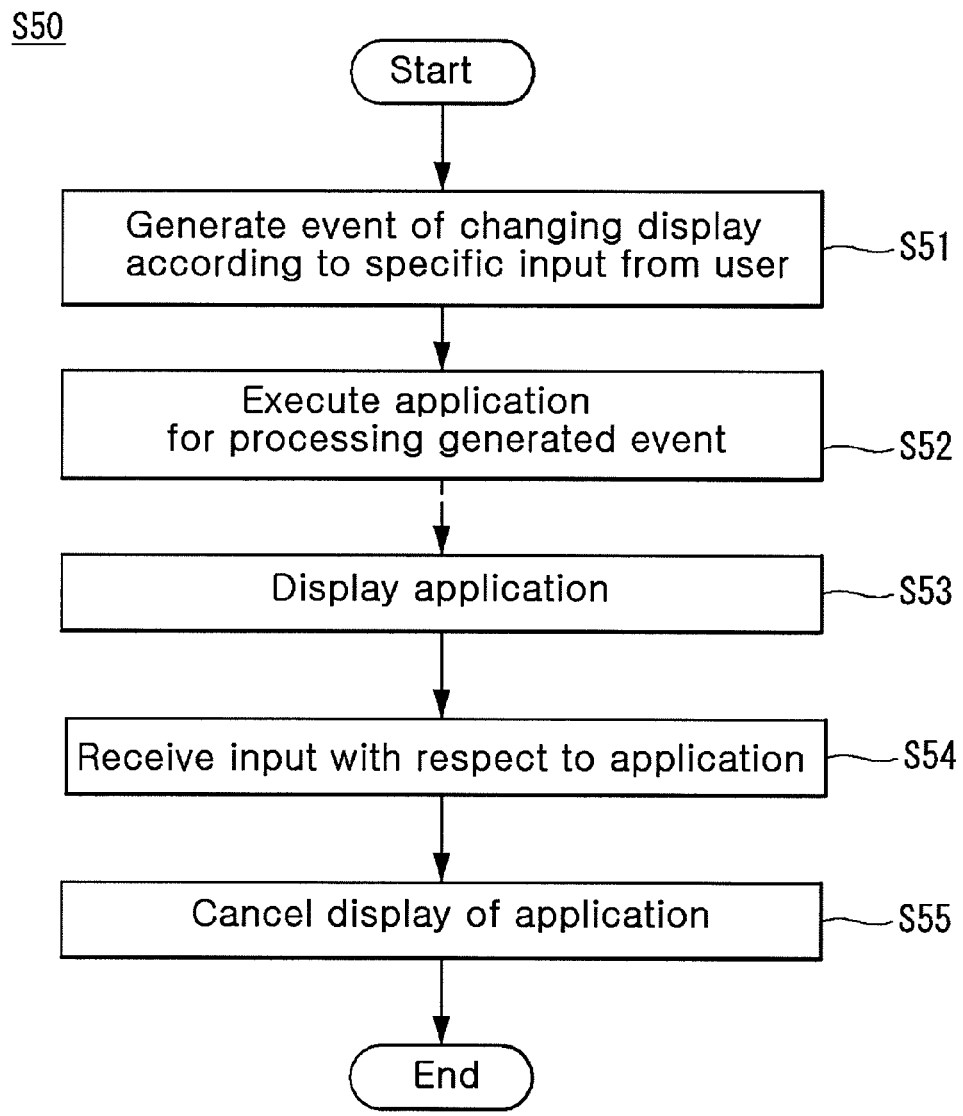
FIG. 7 is a flowchart showing an operation of executing a specific application, shown in FIG. 6, in more detail according to an embodiment of the present invention.

FIG. 7 is a flowchart showing an example of the operation S50 of executing the specific application, shown in FIG. 6.

Referring to FIG. 7, the operation S50 of executing the specific application may include an operation S51 of generating an event of changing the display of the mobile terminal according to a specific input of the user. The event or operation, which causes the previously selected items to be maintained, is an event initiated by the user, which causes the screen image to be changed.

The specific input of the user may be an input applied to the mobile terminal 10 while the mobile terminal 10 is receiving a signal for selecting an item displayed on the mobile terminal. For example, the specific input may correspond to an operation of transmitting a selected item through an e-mail or an operation of activating another function of the mobile terminal 10, such as a camera function. The specific input of the user may be classified as a manual event because the specific input is not automatically generated according to a control operation of the controller 40 shown in FIG. 5 of the mobile terminal 10.

When the event of changing the display according to the specific input of the user is generated (i.e., when an event which is initiated directly by the user occurs which changes the screen image currently displayed), the controller 40 may execute an application for processing the generated event in an operation S52 and display the executed application in an operation S53.

When the event is generated, the controller 40 may load the specific application from a storage unit to a memory of the mobile terminal and execute the specific application. Otherwise, the controller 40 may load the specific application stored in a storage region of the memory to an activation region of the memory. Furthermore, the controller 40 may activate the specific application that has been loaded but inactivated.

The application executed by the controller 40 may be displayed on the touch screen 100 to represent the generation of the event or the execution of the application for processing the event. The application may be displayed on the whole area or a specific part of the touch screen 100. Accordingly, the user can visually recognize whether the input to the mobile terminal is correctly made When or after the application is displayed on the screen of the mobile terminal in the operation S53, an operation S54 of receiving an input with respect to the application may be performed.

An appropriate user input with respect to the executed and displayed application may be received by the mobile terminal. If the executed application relates to e-mail transmission, for example, an input with respect to the selection of an email recipient may be received (e.g., the user may enter the receiver's email address to the screen of the mobile terminal). Furthermore, the input with respect to the application may correspond to a control signal of the controller 40 shown in FIG. 5. For example, when the executed application relates to a camera operation and when an additional input is not applied by the user for longer than a predetermined time after the camera function is executed, the controller 40 may apply a control signal for stopping the execution of the camera function to the application. Generally when the application receives a specific input, the application may execute a specific function corresponding to the received input.

When the input with respect to the application is received in the operation S54, an operation S55 of canceling the display of the application may be carried out. For example, if a specific input for ending the execution of the application is received in the operation S54, the execution of the application may be ended. When the execution of the application is ended, display of the application may be cancelled and the application is no longer displayed on the screen of the mobile terminal. For example, the display of the application on the whole area or a specific part of the touch screen 100 disappears. Then, the operation S70 shown in FIG. 6, which displays the first image for allowing the user to select an item, may be performed by the controller 40 shown in FIG. 5. Here, the item previously selected by the user would be maintained and shown as selected on the screen.

Figure 8:
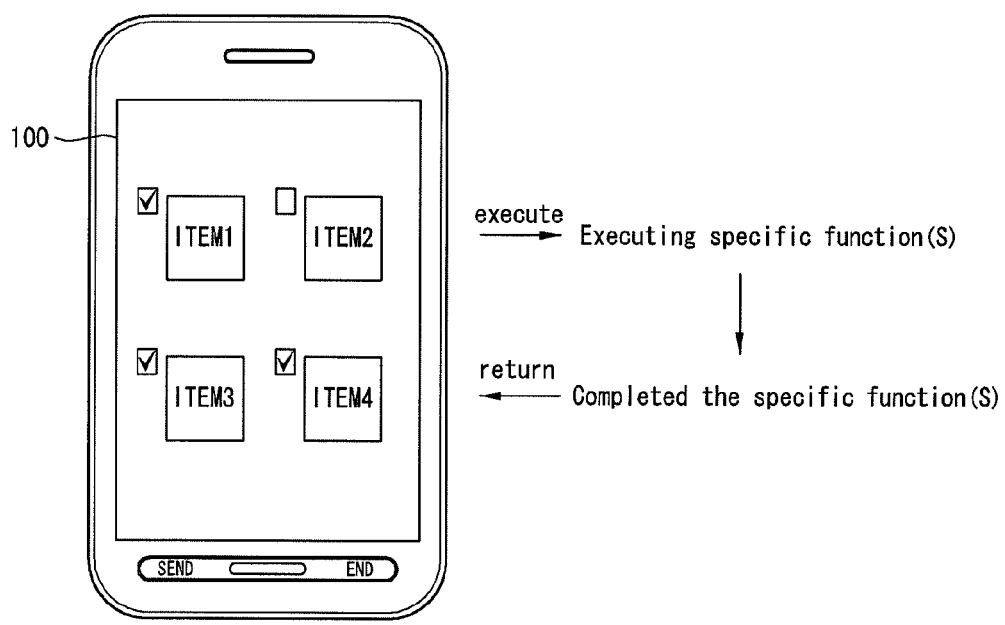
FIG. 8 is a view for explaining an example of an operation of the mobile terminal shown in FIG. 5.
Figure 9:
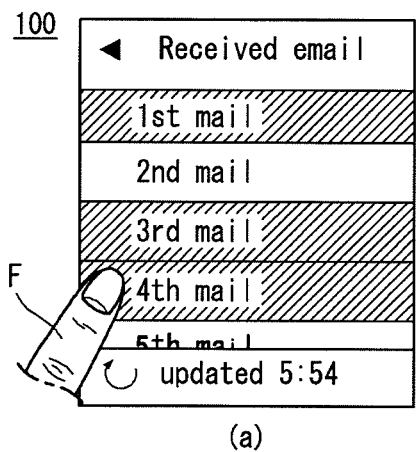
FIGS. 9(*a*)-11(*b*) illustrate an example of an operation of the mobile terminal shown in FIG. 5.
Figure 9:
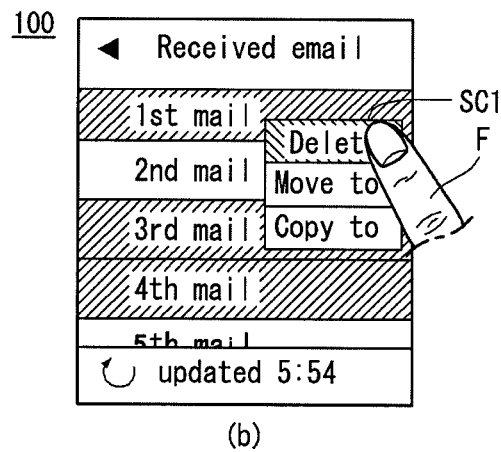
Figure 10:
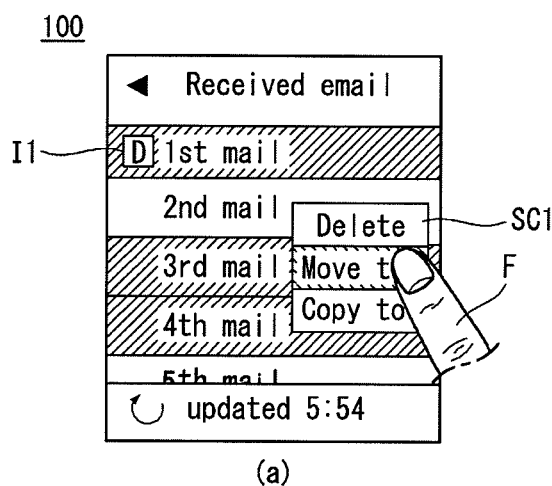
Figure 10:
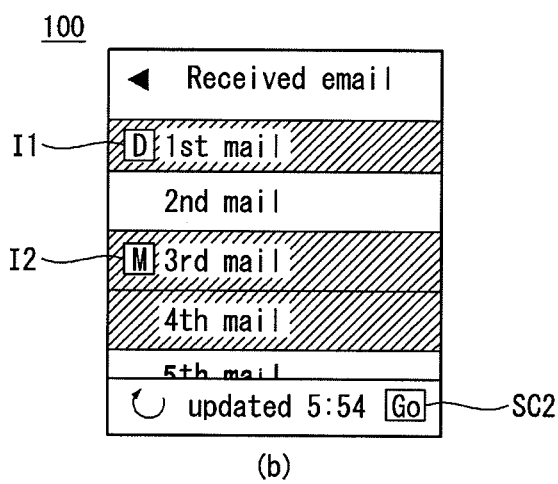
Figure 11:
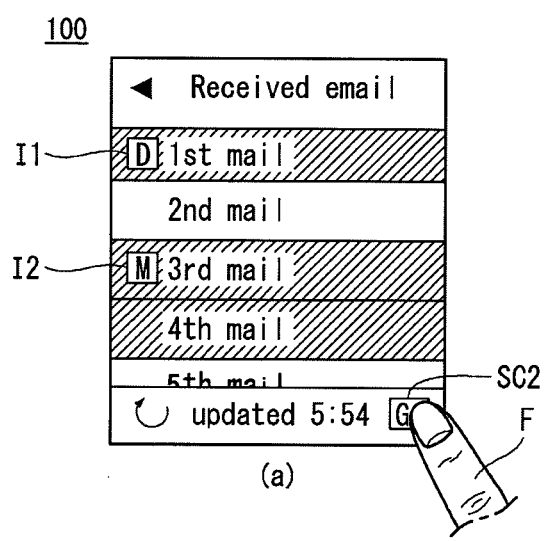
Figure 11:
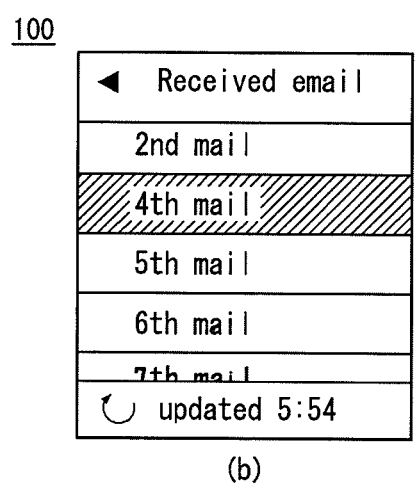
Figure 12:
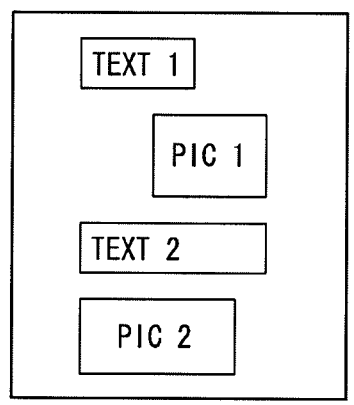
FIGS. 12(*a*)-15(*a*) illustrate another example of an operation of the mobile terminal shown in FIG. 5.
Figure 12:
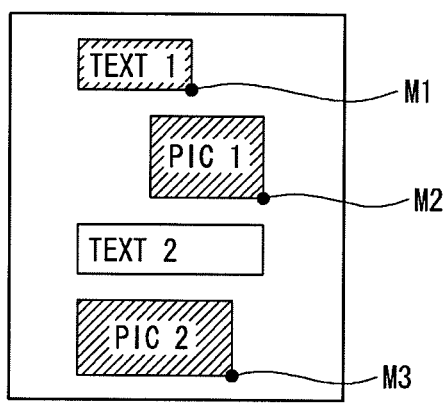
Figure 13:
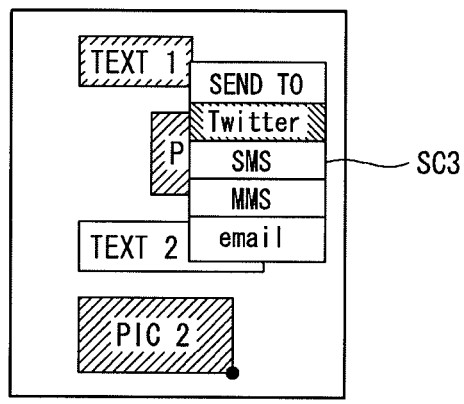
Figure 13:
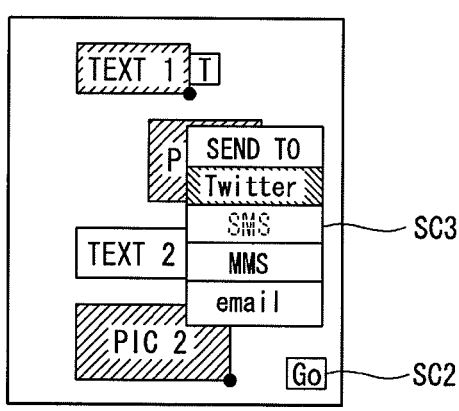
Figure 14:
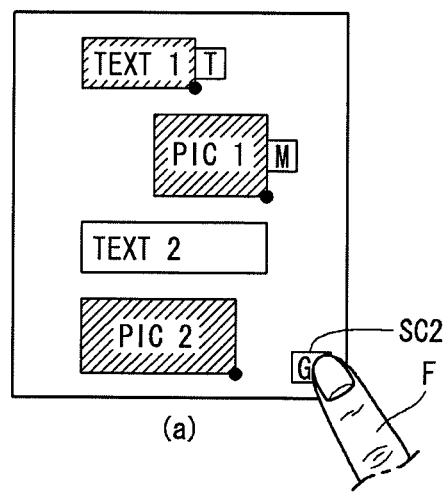
Figure 14:
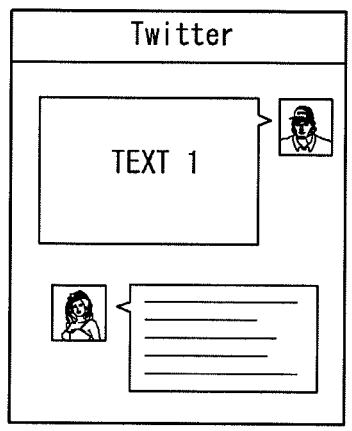
Figure 14:
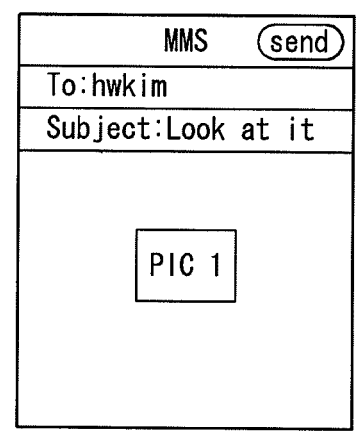

FIG. 8 is a view for explaining an example of an operation of the mobile terminal 10 shown in FIG. 5.

Referring to FIGS. 5 and 8, first, second, third and fourth items ITEM1, ITEM2, ITEM3 and ITEM4, which are selectable by the user, may be displayed on the touch screen 100 of the mobile terminal 10. The first, second, third and fourth items ITEM1, ITEM2, ITEM3 and ITEM4 may be, for example, picture files, texts or the like.

The user may select specific item(s) from the first, second, third and fourth items ITEM1, ITEM2, ITEM3 and ITEM4 displayed on the screen of the mobile terminal. For example, the user may select the first, third and fourth items ITEM1, ITEM3 and ITEM4 as shown. Furthermore, the user may select specific function(s) corresponding to the selected item(s). For instance, the user may select a function of copying the selected ITEM1, ITEM3 and ITEM4 into a file, which may occur using pop-up windows or other menus.

When the specific function(s) selected by the user are executed and the executed functions are terminated or completed, the initial image displaying the first, second, third and fourth items ITEM1, ITEM2, ITEM3 and ITEM4 is displayed again on the screen of the mobile terminal. Here, according to the invention, the selection of the first, third and fourth items ITEM1, ITEM3 and ITEM4 is maintained and shown as still selected on the screen even after the specific function selected by the user has been completed. Accordingly, there is no need for the user to re-select these items again if the user wants to execute another function on these items, e.g., a function of emailing these items. As a result, since the invention maintains the user's selections even after functions for the selected items are completed, multiple functions for the same selected items can be made without having to reselect the items multiple times, which is convenient for the user and saves operation time.

FIGS. 9(a)-11(b) illustrate an example of an operation of the mobile terminal shown in FIG. 5.

Referring to FIGS. 9(a)-11(b), the mobile terminal 10 shown in FIG. 5 may select some of multiple e-mail items displayed on the touch screen 100 and maintain the selection of the e-mail items even after a specific function is executed. Accordingly, it is possible to mitigate the inconvenience that the user has to repeatedly select the same items to perform various operations on the same items.

More specifically, referring to FIG. 9(a), a list of received e-mail items may be displayed on the touch screen 100. Among the received emails, the user may select desired e-mail items using a finger F. For example, the user may select first, third and fourth e-mail items. Although FIGS. 9(a) and 9(b) illustrate the list of received e-mail items, a list of transmitted, stored or deleted e-mail items may be displayed and selected.

Referring to FIG. 9(b), the user may link the first e-mail item among the selected items to a specific function. For example, the user may touch the selected first e-mail item to select the first e-mail item again so as to link the first e-mail item to the specific function. Then, a first input window SC1 may be displayed.

The first input window SC1 may display items (e.g., functions) which can be selected for the selected specific item. If the selected item is an e-mail item as in this example, then functions of deleting, moving and copying the e-mail item may be displayed as examples. In the example of FIG. 9(b), the user has selected the delete function for the selected first e-mail item, and a first icon I1 (FIG. 10(a)) is displayed on the first e-mail item so that the user can clearly recognize the function selected for the specific item. If the selected item is a moving picture, a function of playing the moving picture as well as functions of deleting, moving and copying the moving picture may be displayed. That is, the contents/functions displayed in the first input window SC1 may vary according to the attributes of the selected item. Obviously other examples are possible.

Referring to FIG. 10(a) while the selection of the first, third and fourth e-mail items is maintained on the screen, the user may sequentially or in any order select functions to be executed on the selected items. The user may select the third e-mail and link the third e-mail item to the moving function, which is indicated by a second icon 12 as shown in FIG. 10(b). The functions linked to the first e-mail item and the third e-mail item may be identical to or different from each other. The selected first and third e-mail items may be continuously or discretely marked.

When the user links the specific function to the selected item, a second input window SC2 may be displayed on the touch screen 100. The second input window SC2 corresponds to a button for executing the linked function(s). When all items for which the user wants to perform a specific function or only some of the items are linked to the specific function, the user may select the second input window SC2 to execute the linked function. The mobile terminal 10 shown in FIG. 5 does not cancel the selection of the first, third and fourth items even after the specific functions (deleting and moving functions) are executed, and thus it is possible to mitigate the inconvenience that the user has to select the items again for additional functions.

Referring to FIG. 11(a), the user may select the second input window SC2 by using a finger F when he/she selects all the desired functions. When the user selects the second input window SC2, the functions linked to the first and third e-mail items are executed. As described above, the function linked to the first e-mail item corresponds to the delete function and the function linked to the third e-mail item corresponds to the moving function. When the user selects the second input window SC2, an application for performing the delete function and an application for carrying out the moving function may be executed sequentially or simultaneously.

An application may include an independent application or a process capable of executing a specific function. For example, there exists an additional application for deleting e-mail items or an e-mail delete process included in the currently executed e-mail application is used.

Referring to FIG. 11(b), when the linked functions are executed, display of the touch screen 100 is changed. That is, the selected first and third e-mail items are not marked on the touch screen 100 any more since their linked functions have been performed. However, the fourth e-mail item that was selected but was not linked to a specific function is continuously marked as being selected even after the functions of the first and third e-mail items have been completed. That is, the controller 40 shown in FIG. 5 may maintain the selection of items even after other functions are executed. In a variation, after the linked functions of the first and third e-mail items are performed, the touch screen may display the first, third and fourth email items as being still selected.

FIGS. 12(a)-14(c) illustrate another example of an operation of the mobile terminal shown in FIG. 5.

Referring to FIGS. 12(a)-14(c), the controller 40 shown in FIG. 5 of the mobile terminal 10 may selectively transmit selected items to specific positions.

More specifically as shown in FIG. 12(a), first and second texts TEXT1 and TEXT2 and first and second pictures PIC1 and PIC2 may be displayed on the touch screen 100 of the mobile terminal. Here, texts can include one or more texts or sentences in various languages and URL (Universal resource locator) and pictures can include one or more still images and moving images other than texts. The first and second texts TEXT1 and TEXT2 and the first and second pictures PIC1 and PIC2 may be displayed on the touch screen 100 in a discrete manner.

Referring to FIG. 12(b), the user may select the first text TEXT1 and the first and second pictures PIC1 and PIC2. When the user selects the first text TEXT1 and the first and second pictures PIC1 and PIC2, the selected items may change their colors and/or markers M1, M2 and M3 may be displayed on or next to the selected items on the screen. As a variation, any known means to indicate a selection of the item can be used. This allows the user to visually recognize the selected items.

Referring to FIG. 13(a), the user may link the selected first text TEXT1 to a specific function. For example, when the first text TEXT1 is selected, a third input window SC3 displaying possible functions that can be executed on the first text TEXT1 may be displayed on the touch screen 100. The user may select a desired function, for example, 'send to Twitter', from the displayed functions for the first text TEXT1, which then would be indicated by a marker such as "T" next to the first text TEXT1. Here, some functions (e.g., send through SMS) that are not available for the selected item (TEXT1, e.g., in view of the size or other limitation) may be displayed as non-selectable.

The user may select the first picture PIC1 to link it to a specific function. When the user selects the first picture PIC1, functions that can be performed on the first picture PIC1 may be selectively displayed. For example, the user may select the function of sending the item through MMS (Multimedia Messaging Service), which is then indicated with a marker "M" as shown in FIG. 14(a). Markers or icons corresponding to the linked specific functions may be respectively displayed on the items linked to the specific functions. When the user selects all the specific functions, he/she may select the second input window SC2 to execute all the linked functions simultaneously or sequentially or in any set order as shown in FIGS. 14(b) and 14(c). The controller 40 shown in FIG. 5 may execute the linked functions selected by the user sequentially or simultaneously. For example, when an application of uploading and sending the selected item to Twitter is completed, as shown in FIG. 14(b), an application of sending the MMS may be automatically executed, as shown in FIG. 14(c).

After the linked functions as shown in FIGS. 14(b) and 14(c) have been completed, then the controller 40 shown in FIG. 5 displays on the screen the initial image for selecting items after the execution of the functions selected by the user is ended. Here, the controller 40 can display the selected items being marked. That is, the marked items previously selected by the user as shown in FIG. 12(b) can be maintained and shown as being still selected in FIG. 15(a) even after the linked functions have been performed in FIGS. 14(b) and 14(c). That is, the selection of items can be maintained even after the functions selected by the user, such as 'send to Twitter' and 'send through MMS', are executed, and thus it is possible to mitigate the inconvenience that the user has to repeatedly select the items to perform multiple functions on the selected items.

Figure 15:
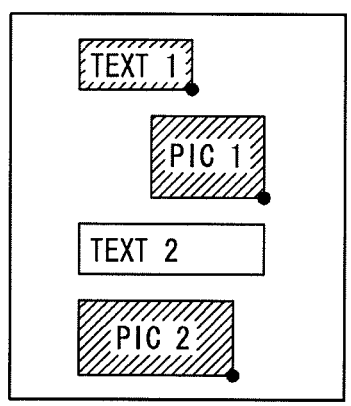
FIG. 15(*b*) illustrates another example of an operation of the mobile terminal shown in FIG. 5.
Figure 15:
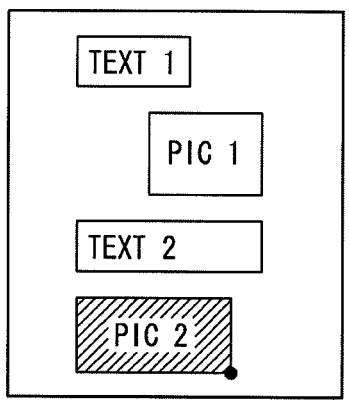
Figure 16:
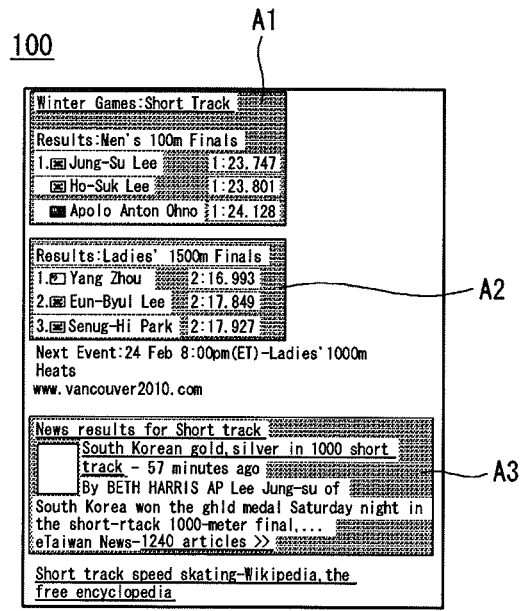
FIGS. 16(*a*)-17(*b*) illustrate another example of an operation of the mobile terminal shown in FIG. 5.
Figure 16:
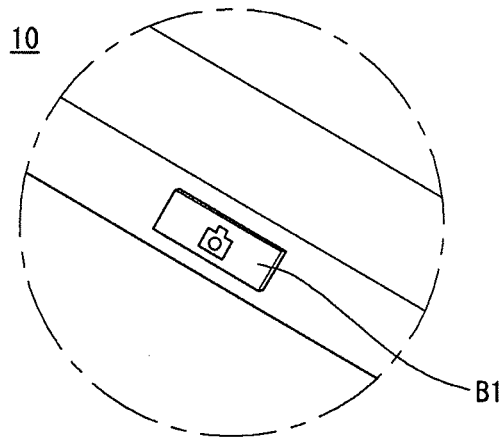
Figure 17:
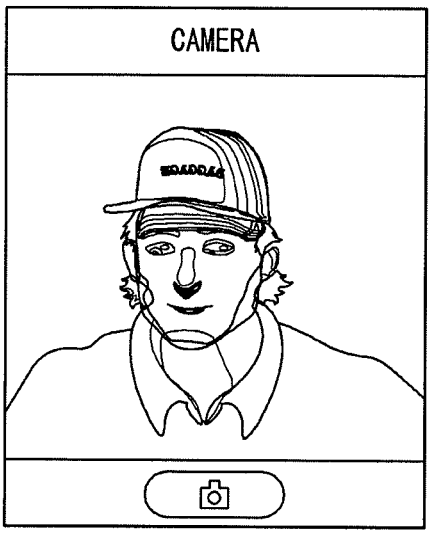

As a variation, after the linked functions as shown in FIGS. 14(b) and 14(c) have been completed, the controller 40 may display the initial image for selecting items with the selection of items on which the specific functions have been executed as being cancelled. That is, the first text TEXT1 on which 'send to Twitter' function has been executed and the first picture PIC1 on which 'send through MMS' function has been performed may be shown as unselected while the selection of the second picture PIC2 on which no function has been executed may be maintained and shown on the screen of the mobile terminal, as shown in FIG. 15(b).

FIGS. 16(a)-17(b) illustrate another example of an operation of the mobile terminal shown in FIG. 5. In this example, when the camera function is executed after the user selects items, the controller 40 of the mobile terminal 10 may maintain the selection of the items after the camera function is completed or ended.

Referring to FIG. 16(a), the user may select first, second and third areas A1, A2 and A3 on the touch screen of the mobile terminal, e.g., using a finger. The user can select the first, second and third areas A1, A2 and A3 by touching specific points or dragging specific regions on the touch screen.

Referring to FIG. 16(b), the user may then push a camera button B1 (or other menu item) after the area A1, A2 and A3 are selected (or during the area selecting process). The camera button B1 may be a physical button attached to the mobile terminal 10. The camera button B1 may function as a hot key for executing the camera function irrespective of execution of other functions. That is, an application relating to the camera function can be executed when the camera button B1 is selected even if a text is being displayed.

Then as shown in FIG. 17(a), when the camera button B1 is pushed by the user to execute the camera-related application, the user can capture a desired image.

Thereafter, referring to FIG. 17(b), when the camera-related application is performed and completed, the initial image for selecting items, being displayed before the camera-related application is executed, may be displayed on the screen of the terminal. That is, the screen switches from that of FIG. 17(a) to that of FIG. 17(b) where the previously selected items are displayed again as still being selected on the touch screen 100. That is, the selection of the items can be maintained irrespective of whether a specific application, initiated by the user input such as the camera operation, is executed.

Figure 18:
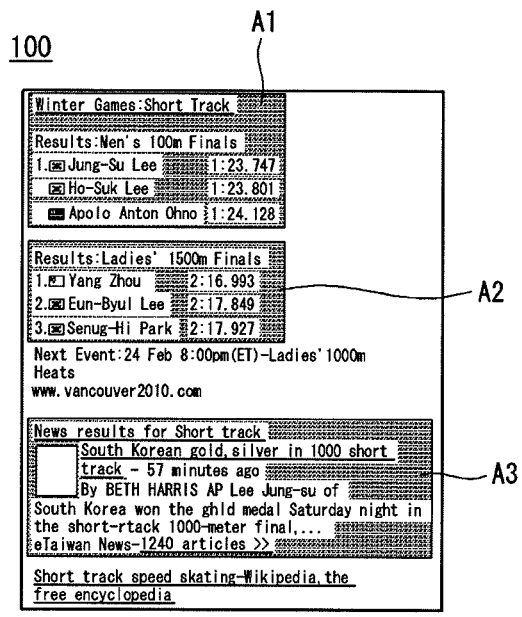
FIGS. 18(*a*) and 18(*b*) illustrate another example of an operation of the mobile terminal shown in FIG. 5.
Figure 18:
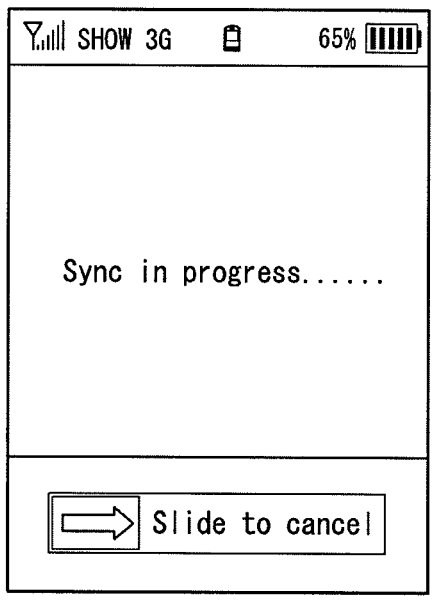
Figure 19:
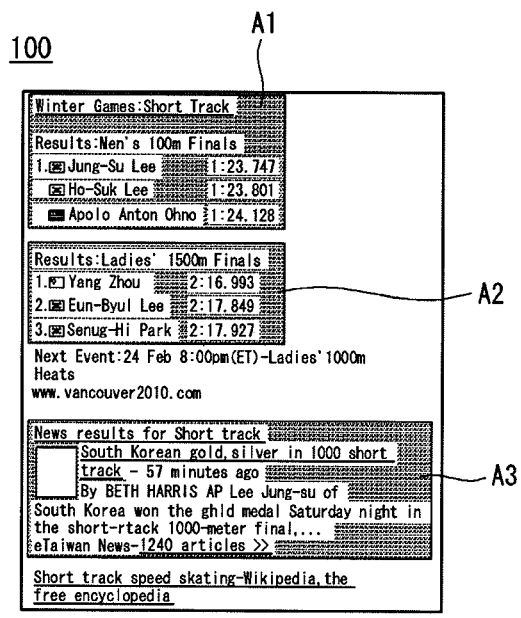
FIGS. 19(*a*)-20(*b*) illustrate another example of an operation of the mobile terminal shown in FIG. 5.
Figure 19:
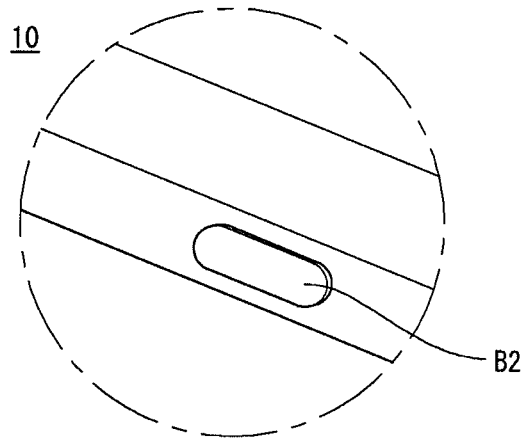
Figure 20:
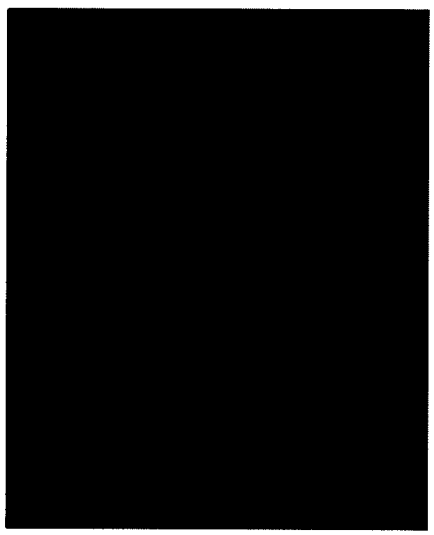
Figure 20:
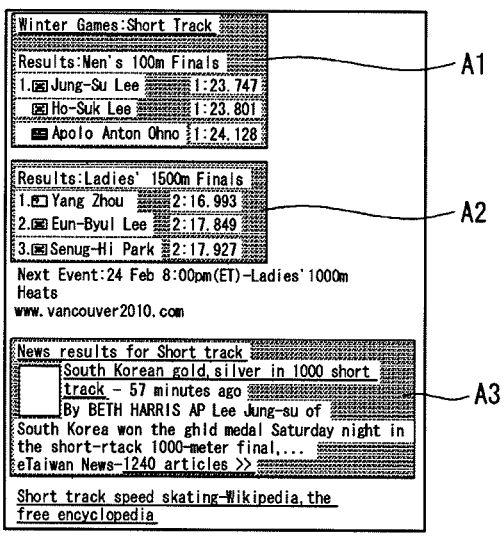

FIGS. 18(a)-18(b) illustrate another exemplary operation of the mobile terminal shown in FIG. 5. In this example, the controller 40 of the mobile terminal 10 can maintain the selection of items even after a function of synchronizing with a specific electronic device is executed.

Referring to FIG. 18(a), the user may select the first, second and third areas A1, A2 and A3 on the screen of the mobile terminal.

Then referring to FIG. 18(b), the user may connect the mobile terminal 10 with a specific electronic device to synchronize the mobile terminal 10 and the electronic device with each other. Synchronization is an operation that transmits information stored in the mobile terminal 10 to another electronic device and/or transmits information stored in the other electronic device to the mobile terminal 10 such that the information of the mobile terminal 10 can correspond to the information of the other electronic device. To perform the synchronization, it may be required to execute an application for synchronization.

When the synchronization is in progress, an image for informing the user that the synchronization is currently being performed may be displayed, as shown in FIG. 18(b). That is, the screen's image switches from that of FIG. 18(a) to that of FIG. 18(b). When the synchronization is completed or terminated, the image of FIG. 18(b) is ended and the image of FIG. 18(a) may be displayed again. That is, the screen's image switches from that of FIG. 18(b) back to that of FIG. 18(a) which still shows the contents previously selected by the user as still selected.

FIGS. 19(a)-20(b) illustrate another exemplary operation of the mobile terminal shown in FIG. 5. In this example, the controller 40 of the mobile terminal 10 may display items, which are selected before the mobile terminal 10 enters an inactive mode, on an image displayed after the inactive mode is terminated. The inactive mode may correspond to a state that supply of power to a specific module such as the touch screen 100 is minimized or terminated.

Referring to FIG. 19(a), the user may select the first, second and third areas A1, A2 and A3 on the screen of the mobile terminal, e.g., using a finger.

Then referring to FIG. 19(b), an inactivate (or inactive) button B2 used for the mobile terminal 10 to enter the inactive mode, which may be attached to the mobile terminal 10, may be selected by the user. When the user pushes or selects the inactive button B2, the mobile terminal 10 enters the inactive mode irrespective of the current state of the mobile terminal 10.

Referring to FIG. 20(a), when the mobile terminal 10 enters the inactivate mode, power to the touch screen 100 may be cut off. Accordingly, the contents selected by the user and displayed on the touch screen 100 may not be displayed, and the screen may display a blank screen.

Thereafter, referring to FIG. 20(b), when the inactive mode is ended according to a user's choice (e.g., the user has deselected the inactive button), the contents that were previously selected by the user (before the inactive mode) may be re-displayed on the touch screen 100 with the items still showing as being selected. As such, the user need not re-select such items.

FIGS. 21(a)-21(b) illustrate another exemplary operation of the mobile terminal shown in FIG. 5. In this example, the controller 40 of the mobile terminal 10 may maintain the selection of the items even after a 3-screen function of sharing the screen with another electronic device is executed. The 3-screen function allows the same images to be displayed on various devices (e.g., mobile terminal, PC, laptop, smart phone, smart TV, etc.) simultaneously so that the user can view the images at any location according to the user's movement.

Figure 21:
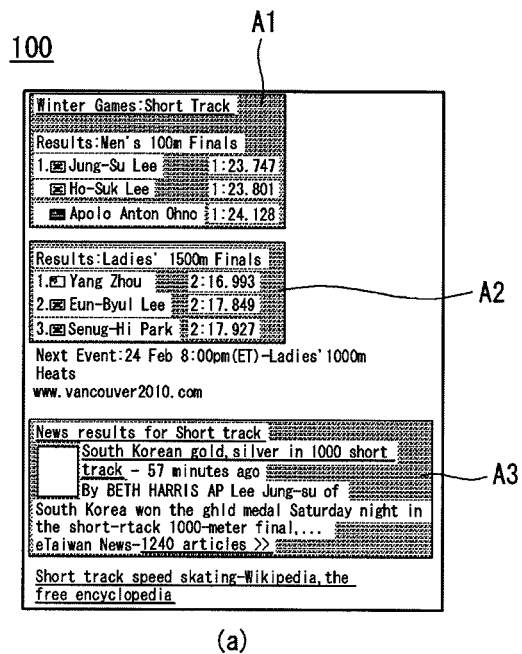
FIGS. 21(a) and 21(b) illustrate another example of an operation of the mobile terminal shown in FIG. 5.
Figure 21:
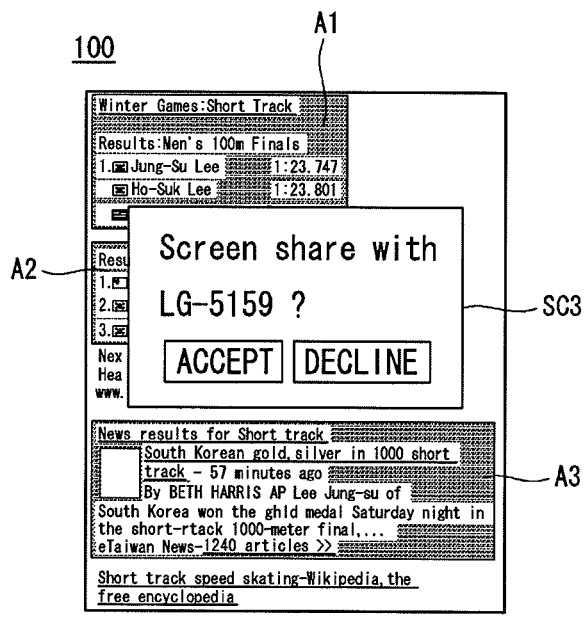

Referring to FIG. 21(*a*), the user may select the first, second and third areas A1, A2 and A3 on the screen of the mobile terminal.

Referring to FIG. 21(*b*), a third input window SC3 related to the 3-screen function may be displayed according to a request from a specific electronic device, a control operation of the controller 40 of the mobile terminal 10 shown in FIG. 5 or an operation of the user. The user may select a desired operation through the third input window SC3 to share images with other electronic device(s). When an application of sharing the images with the specific electronic device is completed, the screen of the mobile terminal returns to the initial image shown in FIG. 21(*a*) with the previously selected items still showing as being selected. That is, the user's selection with respect to the items can be maintained even after a function initiated by the user is completed. Accordingly, it is possible to mitigate the inconvenience that the user has to repeatedly select the same items for multiple functions.

In the above examples, various events which are directly initiated by the user (e.g., sending an email, activating a camera function, etc.) are discussed. The invention is not limited to such examples, and the inventive features are equally applicable any event which is initiated by the user at the mobile terminal, which causes the screen image to be changed.

According to embodiments of the invention, the selection of specific items can be maintained within the mobile terminal in various ways. The selection may be stored and then retrieved when the screen's image returns to the displaying of the selected items, or the image having the selected items may be stored and such image may be re-displayed after the function is completed. For instance, this can be provided by storing information on the selected items in a storage unit of the mobile terminal and then retrieving the same after the execution of the function(s) corresponding to the selected item(s). Then the same retrieved information or a modification as needed may be displayed on the screen. In another example, the initial page (or the item selected page) may be stored in the mobile terminal as a background page and after the execution of the applicable function(s), the background page may be re-displayed as the foreground page on the screen of the mobile terminal. The application/function associated with the selected item can also be switched from an inactive state to an active state to carry out the desired operation/function, and then can be switched back to the inactive state when the previously selected items are re-displayed as still be selected.

Although items are displayed in a single image on the touch screen 100 in the above implementations, items displayed over multiple images may be selected. For example, if there are ten web pages and the first page is currently displayed, the above-described operation can be performed even when items included in the first, fifth and tenth pages are selected.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

What is claimed is:

1. A method of controlling a mobile terminal including a display unit, the method comprising:
   displaying, on the display unit, a first image including a plurality of items;
   receiving a selection of at least one item among the plurality of displayed items;
   indicating the at least one selected item as selected, and upon the selection of the at least one item, displaying a menu for selecting a function for the at least one selected item to be executed on the at least one selected item near the at least one selected item, whereby previous to the selection of the at least one item, the menu is not displayed;
   when the function is selected, displaying a marker corresponding to the selected function near the at least one selected item and displaying a button for executing the selected function separated from the menu;
   when the button is selected, executing the selected function and displaying a second image; and
   after the selected function is executed, re-displaying the first image having one or more of the at least one selected item as still selected without an input of a user and erasing the marker,
   wherein the first image and the second image are respectively displayed on an entire screen of the display unit, and
   wherein the menu comprises a plurality of functions.

2. The method of claim 1, further comprising:
   linking a specific function to one of the at least one selected item,
   performing the linked function according to a selection of the button, and
   after the linked function is performed, re-displaying the first image having the one or more of the at least one selected item as still selected.

3. The method of claim 2, wherein the performing the linked function step includes:
   executing one of delete, move and copy functions on at least one e-mail item selected from a list of e-mail items,
   executing a function of sending at least one item selected from items included in displayed contents to a specific electronic device,
   executing a function of photographing an image,
   executing a synchronization with a specific electronic device,
   performing a conversion to an inactive mode for cutting off a power supply to at least one unit including the screen, and
   executing a function of sharing display images with a specific electronic device.

4. The method of claim 1, wherein the re-displaying step displays the first image having:
   the one item which is used in the execution of the selected function, as unselected, and
   any other selected item which is not used in the execution of the selected function, as still selected.

5. The method of claim 1, wherein the re-displaying step displays the first image having all of the at least one selected item, as still selected.

6. The method of claim 1, wherein the indicating step includes changing a display property of the at least one selected item.

7. The method of claim 1, wherein the executing the selected function step includes:
   loading the selected function to a memory of the mobile terminal, and converting the selected function from an inactive state to an active state or changing a background operation of the selected function to a foreground operation.

8. The method of claim 1, wherein the re-displaying step includes:
converting the selected function from an active state to an inactive state or changing a foreground operation of the selected function to a background operation.

9. The method of claim 1, wherein the executing the selected function step switches the first image to the second image, and the re-displaying step switches the second image to the first image while maintaining at least part of the selection of the at least one item.

10. The method of claim 1, wherein the re-displaying step displays the first image having at least one icon indicating that the execution of the selected function is performed using the at least one item.

11. A mobile terminal comprising:
a display unit including a screen; and
a controller configured to control the display unit and to:
display, on the display unit, a first image including a plurality of items;
receive a selection of at least one item among the plurality of displayed items;
indicate the at least one selected item as selected, and upon the selection of the at least one item, display a menu for selecting a function for the at least one selected item to be executed on the at least one selected item near the at least one selected item, whereby previous to the selection of the at least one item, the menu is not displayed;
when the function is selected, display a marker corresponding to the selected function near the at least one selected item and display a button for executing the selected function separated from the menu;
when the button is selected, execute the selected function and display a second image; and
after the selected function is executed, re-display the first image having one or more of the at least one selected item as still selected without an input of a user and erase the marker,
wherein the first image and the second image are respectively displayed on an entire screen of the display unit, and
wherein the menu comprises a plurality of functions.

12. The mobile terminal of claim 11, the control further configured to:
link a specific function to one of the at least one selected item;
perform the linked function according to a selection of the button, and
after the linked function is performed, re-display the first image having the one or more of the at least one selected item as still selected.

13. The mobile terminal of claim 12, wherein the performing the linked function includes:
executing one of delete, move and copy functions on at least one e-mail item selected from a list of e-mail items,
executing a function of sending at least one item selected from items included in displayed contents to a specific electronic device,
executing a function of photographing an image,
executing a synchronization with a specific electronic device,
performing a conversion to an inactive mode for cutting off a power supply to at least one unit including the screen, and
executing a function of sharing display images with a specific electronic device.

14. The mobile terminal of claim 11, wherein the controller re-displays the first image having:
the one item which is used in the execution of the selected function, as unselected, and
any other selected item which is not used in the execution of the selected function, as still selected.

15. The mobile terminal of claim 11, wherein the controller re-displays the first image having all of the at least one selected item, as still selected.

16. The mobile terminal of claim 11, wherein the controller indicates the at least one selected item as having been selected by:
changing a display property of the at least one selected item.

17. The mobile terminal of claim 11, wherein the executing of the selected function by the controller includes:
loading the selected function to a memory of the mobile terminal, and
converting the selected function from an inactive state to an active state or changing a background operation of the selected function to a foreground operation.

18. The mobile terminal of claim 11, wherein the re-displaying of the first image by the controller includes converting the selected function from an active state to an inactive state or changing a foreground operation of the selected function to a background operation.

19. The mobile terminal of claim 11, wherein the executing the selected function step switches the first image to the second image, and the re-displaying step switches the second image to the first image while maintaining at least part of the selection of the at least one item.

20. The mobile terminal of claim 11, wherein the controller is further configured to:
display at least one icon indicating that the execution of the selected function is performed using the at least one item.

* * * * *